(12) United States Patent
Sunda

(10) Patent No.: US 7,724,895 B2
(45) Date of Patent: May 25, 2010

(54) CORDLESS TELEPHONE APPARATUS

(75) Inventor: Fumihiro Sunda, Nagoya (JP)

(73) Assignee: Brother Kogyo Kabushiki-Kaisha, Nagoya (JP)

( * ) Notice: Subject to any disclaimer, the term of this patent is extended or adjusted under 35 U.S.C. 154(b) by 269 days.

(21) Appl. No.: 12/071,672

(22) Filed: Feb. 25, 2008

(65) Prior Publication Data
US 2008/0207277 A1 Aug. 28, 2008

(30) Foreign Application Priority Data
Feb. 27, 2007 (JP) ............................. 2007-047173

(51) Int. Cl.
*H04M 1/00* (2006.01)
*H04M 9/00* (2006.01)

(52) U.S. Cl. .................... 379/419; 455/573; 379/433.08

(58) Field of Classification Search ................ 320/114, 320/115; 379/419, 433.08, 441, 322, 324, 379/413; 455/572, 573
See application file for complete search history.

(56) References Cited

U.S. PATENT DOCUMENTS

2006/0172763 A1  8/2006  Sunda

FOREIGN PATENT DOCUMENTS

| JP | A 7-221825 | 8/1995 |
|----|-----------|--------|
| JP | A 2000-137005 | 5/2000 |
| JP | A-2002-165384 | 6/2002 |
| JP | A-2006-211786 | 8/2006 |
| WO | WO 2005/065338 A2 | 7/2005 |

*Primary Examiner*—Tuan D Nguyen
(74) *Attorney, Agent, or Firm*—Oliff & Berridge, PLC (57) ABSTRACT

A cordless telephone apparatus includes: a battery which is rechargeable with a direct current based on an electric energy supplied from an outside of the cordless telephone apparatus; a constant current circuit which limits the direct current charged into the battery to a constant current; a voltage-dividing resistor which divides a direct voltage inputted into the constant current circuit; an A/D converter which converts a value of the direct voltage divided by the voltage-dividing resistor into digital data; a charging-state acquiring portion which acquires a charging state of the battery based on the digital data from the A/D converter; and a charging-state informing portion which informs the charging state of the battery acquired by the charging-state acquiring portion.

16 Claims, 8 Drawing Sheets

CORDLESS TELEPHONE APPARATUS

CROSS REFERENCE TO RELATED APPLICATION

The present application claims priority from Japanese Patent Application No. 2007-47173, which was filed on Feb. 27, 2007, the disclosure of which is herein incorporated by reference in its entirety.

BACKGROUND OF THE INVENTION

1. Field of the Invention

The present invention relates to a cordless telephone apparatus that informs a user of a state of charging.

2. Discussion of Related Art

When a cordless telephone apparatus is charged, the cordless telephone apparatus is placed on (in) a charger. As the cordless telephone apparatus is closer to the charger, a howling (an acoustic feedback) may occur. Therefore, in relation to an invention which prevents the howling, there has been recently developed a technique to determine whether the cordless telephone apparatus is close to the charger, as disclosed in Patent Document 1 (JP-A-7-221825), for example.

Whether the cordless telephone apparatus is close to the charger is determined as follows. When a detection coil detects an alternating magnetic field generated by a magnetizing coil provided in the charger, an alternating voltage which generates at opposite ends of the detection coil is inputted into a rectification circuit by electromagnetic induction, and an output voltage diverged from the rectification circuit is inputted into a comparator. Then the comparator compares the output voltage with a reference voltage value, so that it is determined whether the cordless telephone apparatus is close to the charger.

However, in the above-mentioned technique, since the comparator is used for comparing direct voltage converted from alternating voltage with the reference voltage value, only two states can be determined, one of the states being that the cordless telephone apparatus is close to the charger and the other being that the cordless telephone apparatus is not close thereto. Therefore, in a case where the determination technique is applied to a determination of a state of charging, only two states of charging, such as a charging-operable state and a charging-inoperable state, can be determined. In other words, as long as the cordless telephone apparatus is placed on the charger, it is always determined that the cordless telephone apparatus is in the charging-operable state.

Even when the cordless telephone apparatus is placed on the charger, a required time for charging is increased, or a charging operation becomes inoperable, when, in a contact-type charging, a foreign matter exists between a charging terminal of the cordless telephone apparatus and a charging terminal of the charger, or the charging terminal of the cordless telephone apparatus is misaligned with, or in a lifted position relative to (from), the charging terminal of the charger, or when, in a non-contact charging, a foreign matter exists between the cordless telephone apparatus and the charger, or the coil of the cordless telephone apparatus is misaligned with, or in a lifted position relative to the coil of the charger. In the above-mentioned technique, however, it is impossible to properly inform a user of the state of charging. Further, even when the cordless telephone apparatus is correctly placed on the charger, the required time for charging is increased, or the charging operation becomes inoperable, when a coating is formed over at least one of the charging terminals in the contact-type charging. In the above-mentioned technique, however, it is impossible to properly inform the user of the state of charging.

SUMMARY OF THE INVENTION

It is therefore an object of the present invention to provide a cordless telephone apparatus that can properly inform the user of the state of charging.

The above-mentioned object may be achieved according to any one of the following modes of the present invention in the form of the cordless telephone apparatus, each of which is numbered like the appended claims and may depend from the other mode or modes, where appropriate, to indicate and clarify possible combinations of technical features. It is, however, to be understood that the present invention is not limited to the technical features or any combinations thereof that will be described below for illustrative purposes only. It is to be further understood that a plurality of features included in any one of the following modes of the invention are not necessarily provided altogether, and that the invention may be embodied without employing at least one of the features described in connection with each of the modes.

(1) A cordless telephone apparatus comprising:

a battery which is rechargeable with a direct current based on an electric energy supplied from an outside of the cordless telephone apparatus;

a constant current circuit which limits the direct current charged into the battery to a constant current;

a voltage-dividing resistor which divides a direct voltage inputted into the constant current circuit;

an A/D converter which converts a value of the direct voltage divided by the voltage-dividing resistor into digital data;

a charging-state acquiring portion which acquires a charging state of the battery based on the digital data from the A/D converter; and a charging-state informing portion which informs the charging-state of the battery acquired by the charging-state acquiring portion.

According to the present cordless telephone apparatus, the value of the direct current or the direct voltage for charging the battery is calculated as a charging-state value representing an actual state of charging the battery. Therefore, the charging state of the battery can be classified into at least three kinds of the charging state for informing the user, so that the charging state of the battery can be properly informed to the user.

(2) The cordless telephone apparatus according to the mode (1), wherein the charging-state acquiring portion acquires the charging state of the battery based on the digital data from the A/D converter and a volt-ampere characteristic of the constant current circuit.

According to the present cordless telephone apparatus, since the charging-state acquiring portion acquires the charging state of the battery based on the volt-ampere characteristic of the constant current circuit as well as the digital data from the A/D converter, the charging-state acquiring portion can acquire the charging state of a wide range from a low area of the charging current or the charging voltage to a high area thereof. In a case where the charging state of the battery is a defective state, the charging state of the battery always corresponds to a linear portion (a primary proportion) of the volt-ampere characteristic of the constant current circuit, so that defective charging states of the battery can be classified into plural kinds of charging states and distinguished from each other, as occasion demands.

(3) The cordless telephone apparatus according to the mode (1) or the mode (2), wherein the charging-state acquiring portion includes a calculating portion which calculates a charging-state value representing a value of the charging state of the battery based on the digital data and the volt-ampere characteristic of the constant current circuit, and wherein the charging-state acquiring portion acquires the charging state of the battery based on the charging-state value calculated by the calculating portion.

According to the present cordless telephone apparatus, a value of the charging current or the charging voltage is calculated by the calculating portion, and the charging state of the battery is acquired based on the calculation result obtained by the calculating portion, so that a successive change of the charging state of the battery can be acquired, as occasion demands.

(4) The cordless telephone apparatus according to the mode (3), wherein the charging-state informing portion informs that the charging state of the battery is a normal state in a case where the charging-state value calculated by the calculating portion is not smaller than a reference value.

(5) The cordless telephone apparatus according to the mode (4), wherein the charging-state informing portion informs that the charging state of the battery is an unusual state, in which a required time for charging the battery is longer than that in the normal state, in a case where the charging-state value calculated by the calculating portion is smaller than the reference value.

(6) The cordless telephone apparatus according to the mode (4) or the mode (5), wherein the charging-state informing portion informs that the charging state of the battery is an abnormal state in a case where the charging-state value calculated by the calculating portion is smaller than a second reference value that is smaller than a first reference value as the reference value.

(7) The cordless telephone apparatus according to any of the modes (3) through (6), further comprising a transmitting portion which transmits, to an external equipment connected to the cordless telephone apparatus, data that the charging state of the battery is an abnormal state in a case where the charging-state value calculated by the calculating portion is smaller than a reference value.

According to the present cordless telephone apparatus, through the external equipment connected to the cordless telephone apparatus for transmission of data, the charging state of the battery that is the abnormal state or far from the normal state can be informed to the user who is located apart from the cordless telephone apparatus.

(8) The cordless telephone apparatus according to any of the modes (3) through (7), further comprising a required-time estimating portion which estimates a required time for charging the battery based on the charging-state value calculated by the calculating portion.

According to the present cordless telephone apparatus, the required-time estimating portion estimates the required time for charging the battery based on relation between the value of the direct current or the direct voltage during an actual charging of the battery and a capacity of charging required for the battery. The required time for charging the battery estimated by the required-time estimating portion is useful for control related to the charging operation of the battery.

(9) The cordless telephone apparatus according to mode (8), further comprising a required-time informing portion which informs an estimation result obtained by the required-time estimating portion.

The present cordless telephone apparatus can inform the user of the required time for charging the battery that is estimated by the required-time estimating portion based on the charging-state value, e.g., the value of the direct current or the direct voltage, contributing to an action taken by the user after having informed the user of the required time for charging the battery.

(10) The cordless telephone apparatus according to the mode (1), wherein the charging-state acquiring portion determines that the charging state of the battery is either one of at least three kinds of charging states, based on respective comparisons between the digital data from the A/D converter and at least two reference values different from each other.

(11) The cordless telephone apparatus according to the mode (10), wherein the at least two reference values consist of voltage reference values.

(12) The cordless telephone apparatus according to the mode (11), wherein the charging-state acquiring portion includes an input-voltage acquiring portion which acquires an input voltage inputted into the constant current circuit, based on the digital data from the A/D converter, and wherein the input voltage acquired by the input-voltage acquiring portion is compared with the voltage reference values.

(13) The cordless telephone apparatus according to the mode (10), wherein the charging-state acquiring portion includes a charging-current acquiring portion which acquires a charging current supplied to the battery based on the digital data from the A/D converter, and wherein the at least two reference values consist of at least two current reference values which should be compared with the charging current.

(14) The cordless telephone apparatus according to any of the modes (1) through (13), further comprising:
a current-receiving portion which receives an alternating current; and
a rectification circuit which converts the alternating current received by the current-receiving portion into a direct current,
wherein the constant current circuit limits the direct current outputted from the rectification circuit to the constant current.

(15) The cordless telephone apparatus according to the mode (14), wherein the current-receiving portion includes a secondary coil which receives the alternating current via a magnetic flux energy generated by a primary coil.

According to the present cordless telephone apparatus, the alternating current is contactlessly supplied from the primary coil to the secondary coil for performing a non-contact charging of the battery. By enjoying effects provided in the above-mentioned modes, even when a foreign matter exists between the cordless telephone apparatus and the charger, or the secondary coil is misaligned with, or in a lifted position relative to, the primary coil, the cordless telephone apparatus can control a performance of the charging of the battery depending on the charging state.

(16) The cordless telephone apparatus according to any of the modes (1) through (13), further comprising a current-receiving portion which receives a direct current,
wherein the constant current circuit limits the direct current received by the current-receiving portion to the constant current.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Figure 3:
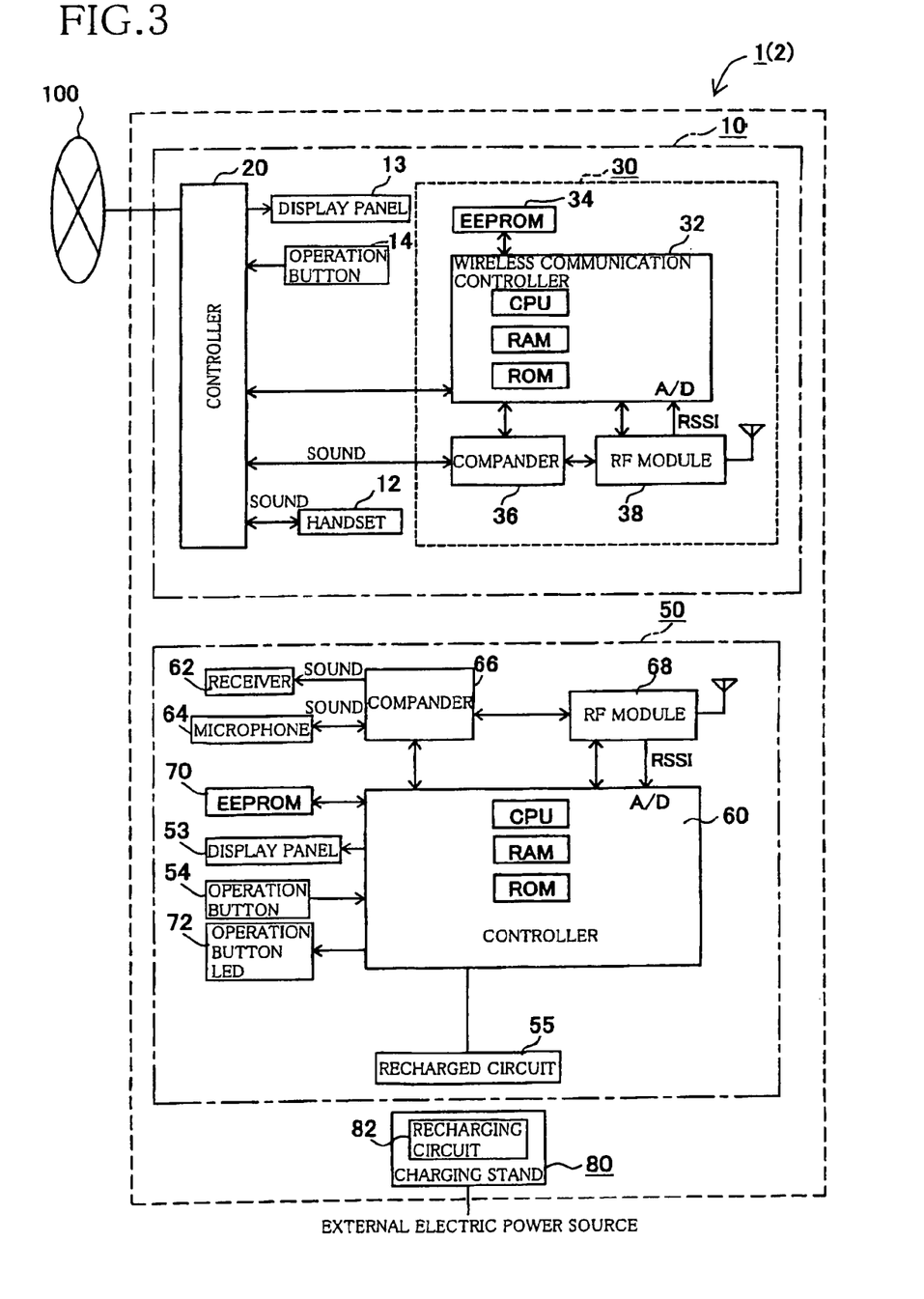
FIG. 3 is a block diagram illustrating an electric system of the telephone apparatus.
Figure 4:
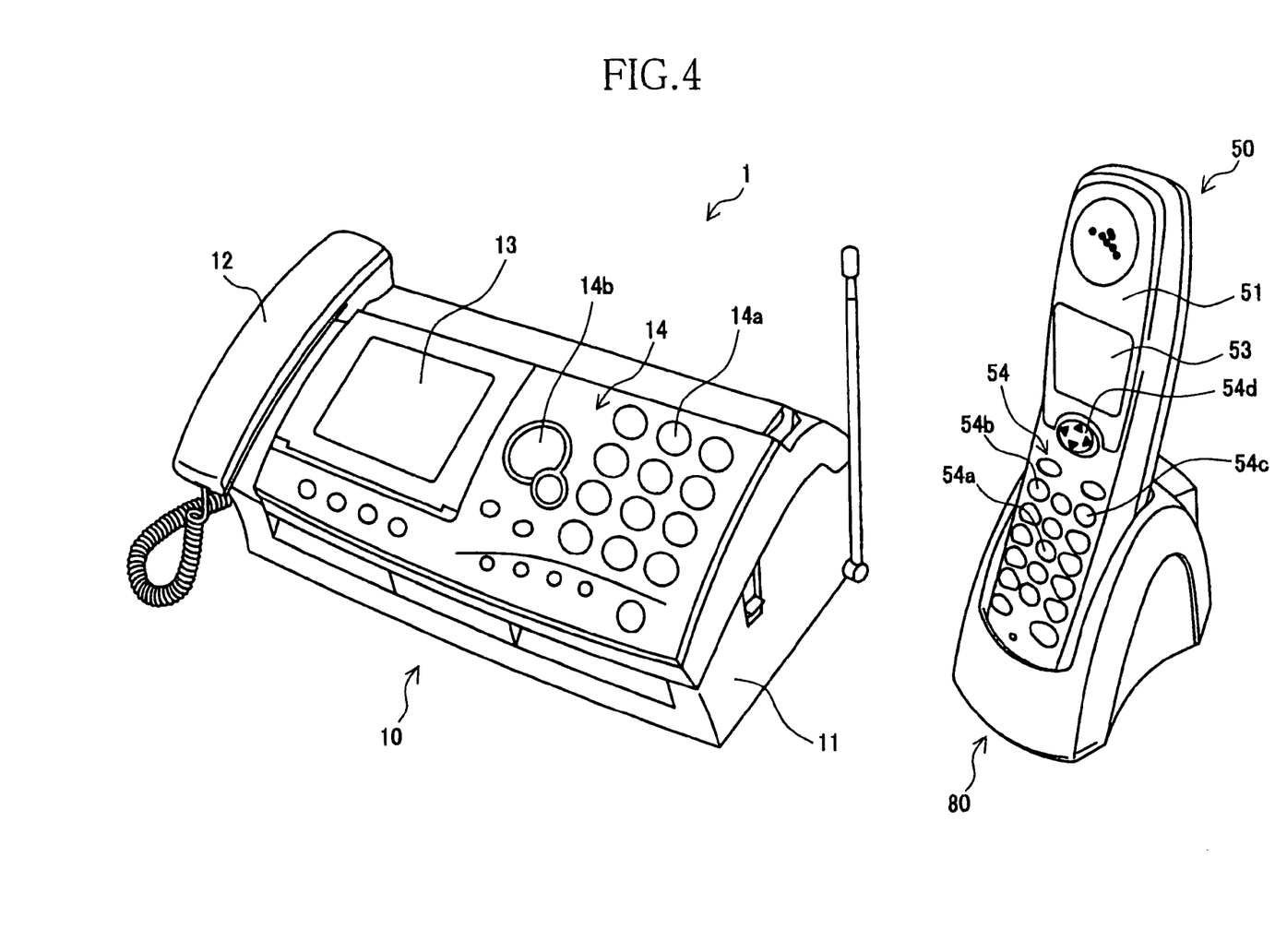
FIG. 4 is a perspective view of the telephone apparatus.

Hereinafter, there will be described preferred embodiments of the present invention with reference to the drawings. A telephone apparatus 1 has functions including a telephone communicating function for conducting a verbal communication through a telephone network 100 (shown in FIG. 3) and a facsimile-machine function for transmitting and receiving image data through the telephone network 100. As shown in FIG. 4, the telephone apparatus 1 includes: a main phone 10 which is connected to the telephone network 100; a cordless handset 50 which is connected to the main phone 10 through a wireless network; and a charging stand 80 which is connected to an external electric power source, and in which the cordless handset 50 is placeable. The charging stand 80 is provided to charge the cordless handset 50 placed in the charging stand 80 with a predetermined voltage. In the present embodiment, composing elements related to the facsimile-machine function are not directly related to the present invention, so that detailed descriptions thereof are omitted.

In the telephone apparatus 1, a handset 12 is attached to a side portion of a main body casing 11 of the main phone 10. The handset 12 functions as a transmitter and a receiver which are in use when the handset 12 is detached from the main body casing 11. In an upper surface of the main body casing 11, there are provided a display panel 13 which displays information related to various functions of the telephone apparatus 1, and various operation buttons (keys) 14 including dial buttons 14a for inputting a phone number of who to contact, and a select button 14b which is operated by a user to select various commands of a menu indicated on the display panel 13. In the present embodiment, the display panel 13 constitutes a liquid crystal display (LCD) with backlighting from a rear side thereof.

Figure 2A:
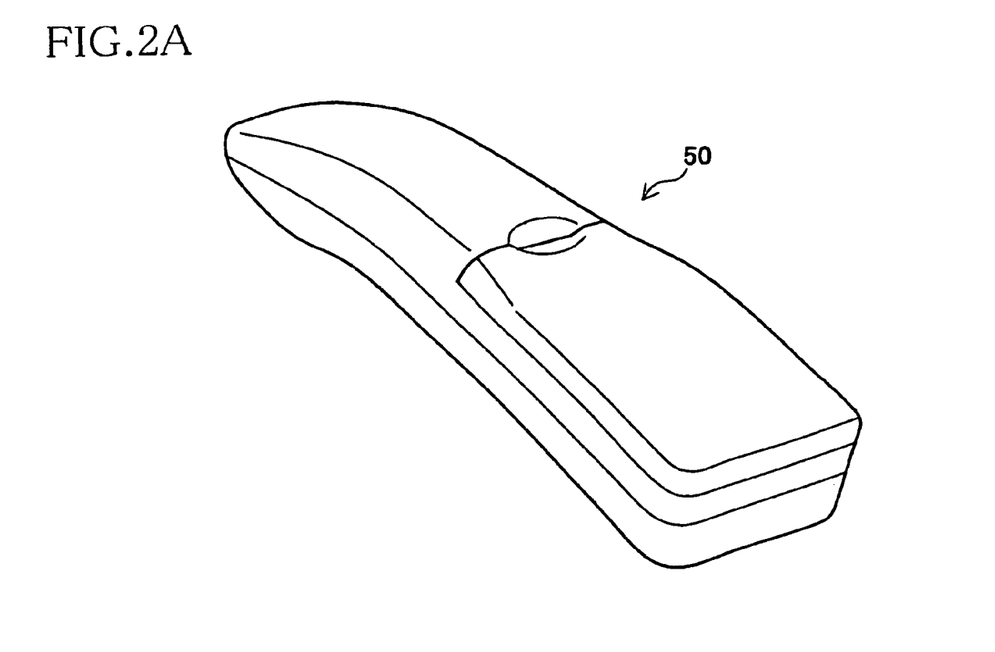
FIG. 2A is a perspective view of a rear surface of a cordless handset of the telephone apparatus.

The cordless handset 50, in an outer surface of a main body casing 51 thereof which has a handset-like structure, includes a display panel 53 which displays information related to various functions of the telephone apparatus 1, and various operation buttons (keys) 54 including (1) dial buttons 54a for inputting a phone number of who to contact, (2) an outside (external) line button 54b which is operated by the user to start an outside call, (3) a cutting-line button 54c which is operated by the user to end (cut) the outside call, and (4) a select button 54b which is operated by the user to select various commands of a menu indicated on the display panel 53.

Figure 2B:
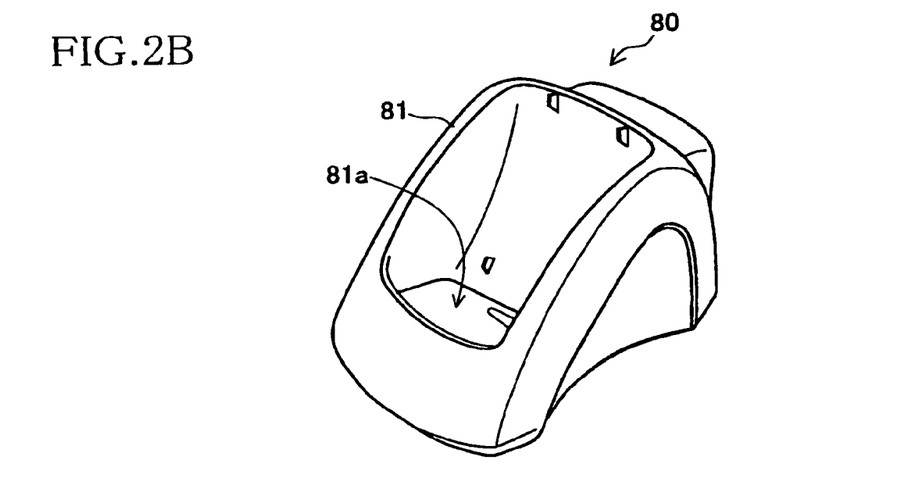
FIG. 2B is a perspective view of a charging stand of the telephone apparatus.

In the present embodiment, the display panel 53 constitutes a liquid crystal display (LCD) with backlighting from a rear side thereof. As shown in FIG. 2B, the charging stand 80 includes a main body 81 as a casing which has a recessed portion 81a. The cordless handset 50 is freely attachable to and detachable from the recessed portion 81a of the main body 81.

Next, there will be described an electric system of the telephone apparatus 1 with reference to FIG. 3. The main phone 10 includes a controller 20 which controls various operations of the telephone apparatus 1, the handset 12, the display panel 13, the operation button 14, and a wireless communication portion 30.

The controller 20 receives an output signal supplied from the operation button 14, an output signal (a sound signal and a data signal) supplied from the wireless communication portion 30 and a sound signal supplied from an outside of the telephone apparatus 1. Also, the controller 20 determines a transmission passage including a transmission destination to which the sound signal is inputted from the outside of the telephone apparatus 1, and a transmission source from which the sound signal is outputted to the outside of the telephone apparatus 1. More precisely, when the handset 12 is detached from the main body casing 11, the controller 20 determines the handset 12 as the transmission passage. When the user starts a call-starting operation to start a call by the cordless handset 50, the controller 20 determines the wireless communication portion 30 as the transmission passage.

Further, the controller 20 outputs a data signal and a sound signal for a wireless communication with the cordless handset 50 to the wireless communication portion 30, and outputs a sound signal from the handset 12 and the wireless communication portion 30 to the outside of the telephone apparatus 1.

The wireless communication portion 30 includes: a wireless communication controller 32 including a CPU (Central Processing Unit), a ROM (Read Only Memory), a RAM (Random Access Memory) and an A/D (Analog/Digital) converter; an EEPROM (Electrically Erasable and Programmable Read Only Memory) 34; compander 36; and an RF (Radio Frequency) module for a wireless communication between the wireless communication portion 30 and the cordless handset 50.

The compander 36 receives a wireless signal outputted from the cordless handset 50 via the RF module 38, and sorts the received wireless signal into a sound signal and a data signal, so as to transmit the sound signal and the data signal to the controller 20 and the wireless communication controller 32, respectively. Further, the compander 36 transmits a sound signal supplied from the controller 20 and a data signal supplied from the wireless communication controller 32, to the RF module 38.

The RF module 38, which is configured to be able to communicate with the wireless communication controller 32, selects a wireless channel (that is used for a wireless communication) out of a plurality of wireless channels having respective different frequencies based on a command supplied from the wireless communication controller 32. Then, by using the selected wireless channel, the RF module 38 transmits an output signal supplied from the compander 36, to the cordless handset 50, and receives a wireless signal supplied from the cordless handset 50.

In the present embodiment, the wireless channels which the RF module 38 uses for the wireless communication are eighty-nine wireless channels having different frequencies with a frequency spacing of 12.5 kHz in 380 MHz band. Further, the wireless channels which the cordless handset 50 (specifically, a RF module 68 mentioned later) uses for the wireless communication are eighty-nine wireless channels having different frequencies with a frequency spacing of 12.5 kHz in 280 MHz band. The RF module 38 and the RF module 68 use a channel 46 and a channel 89, respectively, for transmitting and receiving data signals while using either one of channels 1 to 45 and either one of channels 47 to 88, respectively, for transmitting and receiving sound signals. Hereinafter, in a case where wireless channels used between the main phone 10 and the cordless handset 50 are distinguished from each other, the channels 46, 89 are referred to as control channels while the channels 47 through 88 are referred to as communication channels.

Further, the RF module 38 detects a signal strength of a signal wirelessly received from the outside of the telephone apparatus 1 and outputs a result of detection to an A/D converter of the wireless communication controller 32. In the present embodiment, the A/D converter converts the result of detection inputted from the RF module 38 into an 8-bit digital value.

The wireless communication controller 32 receives data signals outputted (supplied) from the controller 20 and the compander 36, and outputs the data signal outputted (supplied) from the controller 20, to the compander 36.

Furthermore, the wireless communication controller 32 selects usable wireless channels based on the signal strength detected by the RF module 38 and transmits a result of selection to the RF module 38, when the main phone 10 starts a communication with the cordless handset 50. Thus, the main phone 10 starts the wireless communication with the cordless handset 50 by using the wireless channels selected by the wireless communication controller 32.

Next, the cordless handset 50 includes: a controller 60 which controls various operations of the cordless handset 60; the display panel 53; the operation button 54; a receiver 62; a microphone 64; a compander 66; an RF module for a wireless communication between the cordless handset 50 and the main phone 10 (more precisely, the RF module 38), that is, wirelessly transmitting or receiving a sound signal and/or a data signal therebetween; an EEPROM 70; an operation-button LED (Light-Emitting Diode) 72 for backlighting the operation button 54 from a rear side thereof and a recharged circuit 55 which charges a secondary battery 105 (shown in FIG. 1) for supplying an electric power source to the cordless handset 50 with an electric power supplied from the charging stand 80.

The compander 66 receives a wireless signal outputted from the main phone 10 via the RF module 68, and sorts the wireless signal into a sound signal and a data signal, so as to transmit the sound signal and the data signal to the receiver 62 and the controller 60, respectively. Also, the compander 66 transmits a sound signal supplied from the microphone 64 and a data signal supplied from the controller 60, to the RF module 68.

The RF module 68, which is configured to be communicable with the controller 60, selects a wireless channel (that is used for a wireless communication) out of eighty-nine (a plurality of) wireless channels (having respective different frequencies), based on a command supplied from the controller 60. Then, by using the selected wireless channel the RF module 68 transmits an output signal supplied from the compander 66, to the main phone 10, and receives a wireless signal supplied from the main phone 10.

Further, the RF module 68 detects a signal strength of a signal wirelessly received from the outside of the telephone apparatus 1 and outputs a result of detection to an A/D converter provided in the controller 60. In the present embodiment, the A/D converter of the controller 60 converts the result of detection inputted from the RF module 68 into an 8-bit digital value (hereinafter, referred to as an RSSI (Received Signal Strength Indicator/Indication) value).

The controller 60 includes a CPU, a RAM, a ROM, and an A/D converter, and receives an output signal from the operation button 54 and a data signal from the compander 66. Also, the controller 60 outputs a data signal for a wireless communication with the main phone 10.

Furthermore, the controller 60 is configured to be able to communicate with the RF module 68, and, when the cordless handset 50 starts a communication with the main phone 10, the controller 60 selects a usable wireless channel based on the signal strength detected by the RF module 68, and transmits a result of selection to the RF module 68. Accordingly, the cordless handset 50 starts the wireless communication with the main phone 10 by using the wireless channel selected by the controller 60.

Further, while the cordless handset 50 is in the wireless communication with the main phone 10 through the communication channel, the controller 60 periodically detects, via the RF module 68, the signal strength which is transmitted from the main phone 10 through the communication channel and calculates an average value of the signal strengths (that is, the RSSI values) acquired over the past five times.

Then, the controller 60 compares the calculated average values with a plurality of reference values (thresholds) stored in the ROM so as to digitalize (quantify) the average values in a stepwise manner. The controller 60 then forms a schematic figure based on the digitalized values, and operates the display panel 53 to display the schematic figure as a communication state between the cordless handset 50 and the main phone 10. A detailed description of the above-mentioned matter is omitted.

The charging stand 80, including a recharging circuit 82, generates a magnetic field by receiving an electric energy supplied from the external electric power source and contactlessly supplies the electric energy to the cordless handset 50.

Figure 1:
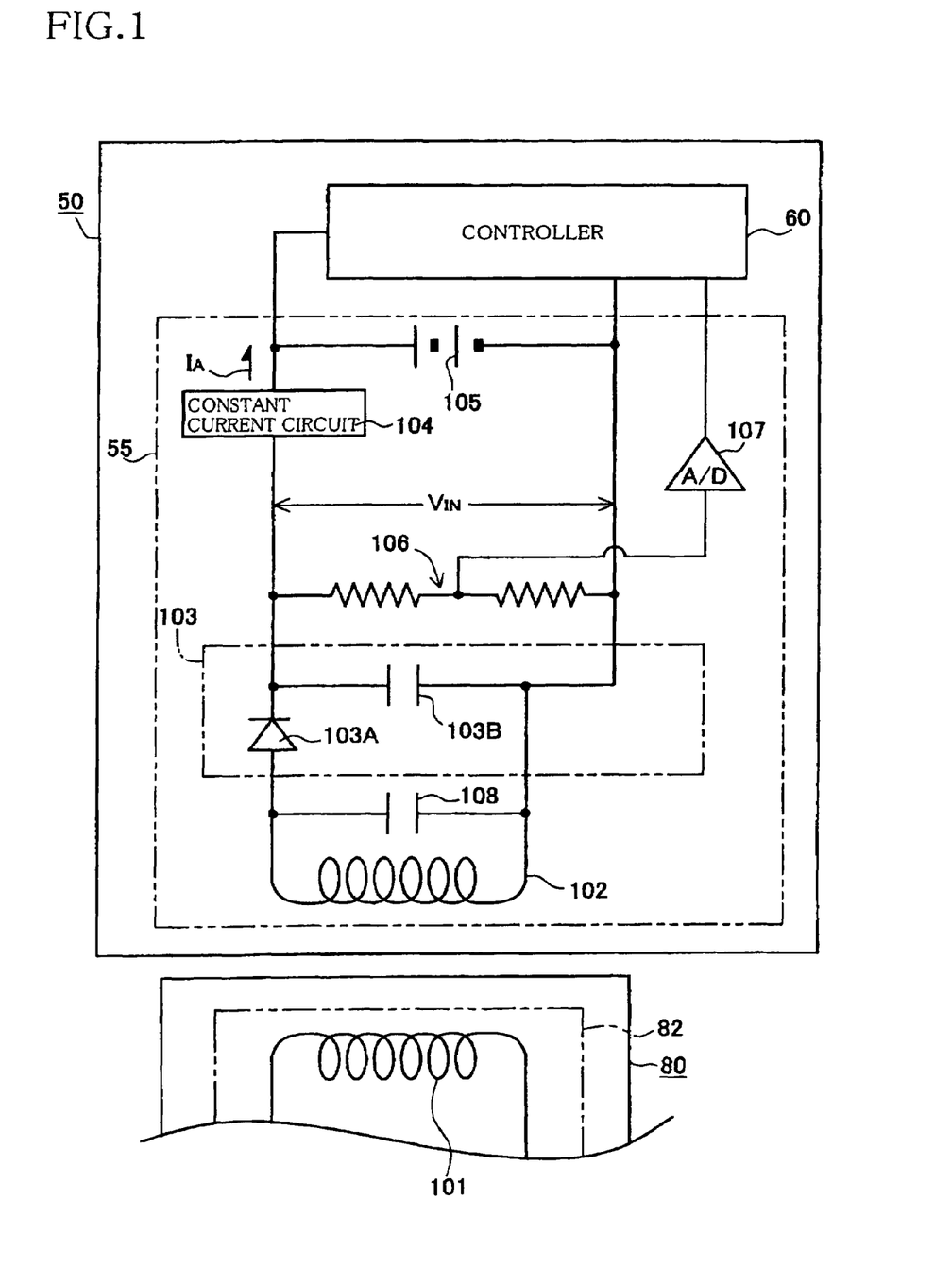
FIG. 1 is a block diagram illustrating an electric system of a telephone apparatus as one embodiment to which the present invention is applied.

There will be described a non-contact supply of the electric energy between the cordless handset 50 and the charging stand 80. As shown in FIG. 1, the recharging circuit 82 of the charging stand 80 includes a primary coil 101.

The recharged circuit 55 of the cordless handset 50 includes a secondary coil 102, a resonant capacitor 108, a rectification circuit 103, a constant current circuit 104 and a secondary battery 105. The secondary coil 102 constitutes a current receiving portion which receives an alternating voltage through a magnetic flux energy generated by the primary coil 101 of the charging stand 80. The resonant capacitor 108 decreases dropping of a voltage upon output of a current from the secondary coil 102 as the current receiving portion. The rectification circuit 103 that includes a diode 103A and a condenser 103B converts the alternating voltage received by the secondary coil 102 into the direct voltage. The constant current circuit 104 limits or controls the direct current outputted from the rectification circuit 103 to or at a constant current. The secondary battery 105 is connected to the constant current circuit 104 and is charged (recharged) with a direct current $I_A$ outputted from the constant current circuit 104.

The recharged circuit 55 of the cordless handset 50 further includes a voltage-dividing resistor 106 which divides a direct voltage outputted from the rectification circuit 103, and an A/D converter 107 which converts the divided direct voltage value into digital data. The digital data converted from the A/D converter 107 is inputted into the controller 60, so that a value of the direct current $I_A$ outputted from the constant current circuit 104 is obtained as a charging current value of the secondary battery 105.

Therefore, a resistance ratio of the voltage-dividing resistor 106 and a volt-ampere characteristic of the constant current circuit 104 (shown in FIG. 5) are stored (inputted) in the controller 60. The controller 60 calculates a value of the direct voltage V outputted from the rectification circuit 103, based on the resistance ratio of the voltage-dividing resistor 106 and the digital data from the A/D converter 107 (a value of the direct voltage divided by the voltage-dividing resistor 106). Since the direct voltage V outputted from the rectification circuit 103 is equal to a direct voltage $V_{IN}$ inputted into the constant current circuit 104. Accordingly, when the value of the direct voltage V outputted from the rectification circuit 103 is obtained, the value of the direct current $I_A$ outputted from the constant current circuit 104 (that is, the charging current value of the secondary battery 105) can be detected based on the volt-ampere characteristic of the constant current circuit 104.

Figure 5:
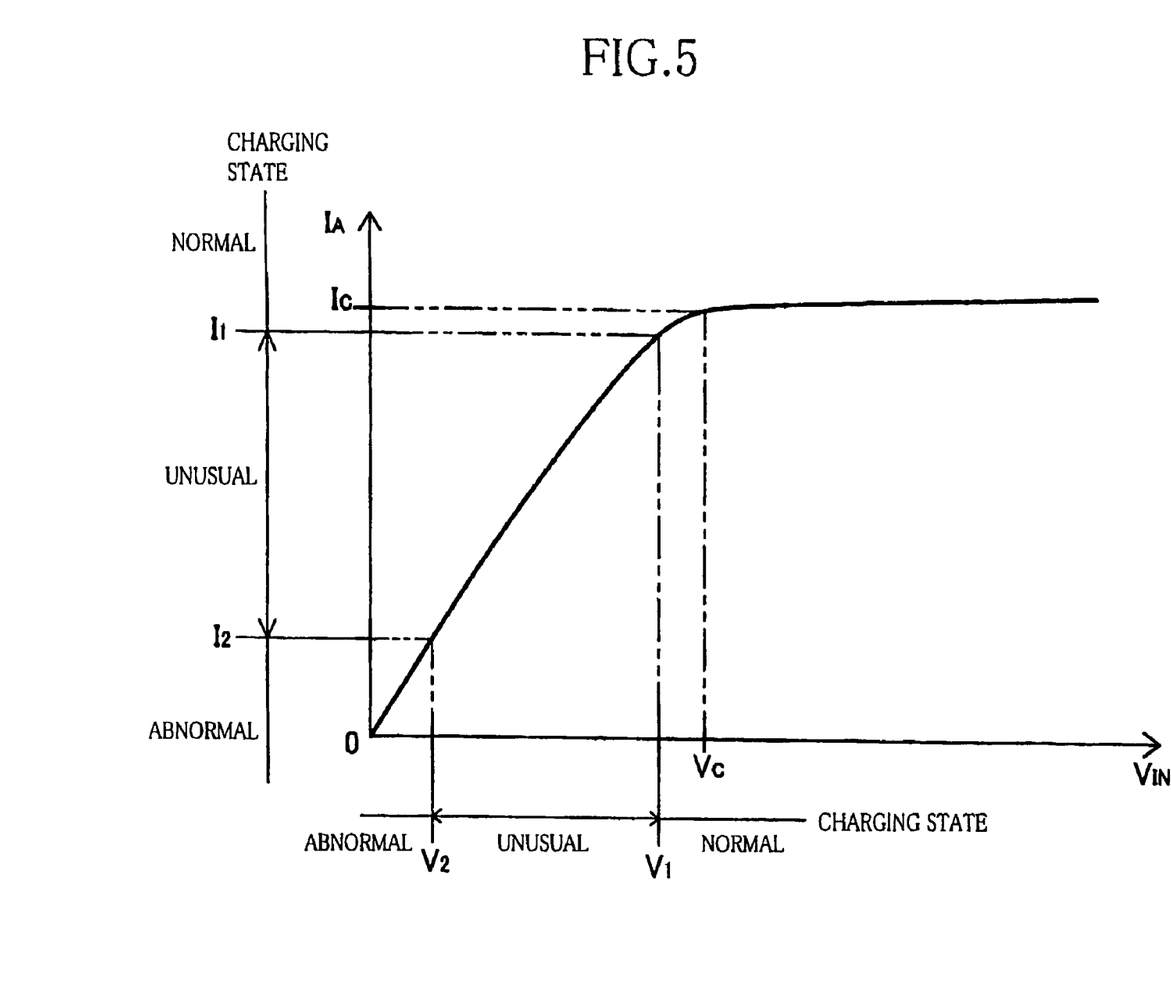
FIG. 5 is an illustrative view showing a volt-ampere characteristic of a constant current circuit provided in the cordless handset.

As shown in FIG. 5, the constant current circuit 104 has a characteristic that, when the value of the direct voltage $V_{IN}$ inputted into the constant current circuit 104 (that is, the direct voltage outputted from the rectification circuit 103) is larger than a voltage value $V_C$, the value of the direct current $I_A$ outputted from the constant current circuit 104 is constant at a current value $I_C$.

Further, in the constant current circuit 104, when the value of the direct voltage $V_{IN}$ inputted into the constant current circuit 104 is smaller than the voltage value $V_C$, the value of the direct voltage $V_{IN}$ is primarily or secondarily proportional to the value of the direct current $I_A$ outputted from the constant current circuit 104.

Accordingly, by using the volt-ampere characteristic of the constant current circuit 104 shown in FIG. 5, the value of the direct current $I_A$ outputted from the constant current circuit 104 can be calculated based on the value of the direct voltage $V_{IN}$ inputted into (supplied to) the constant current circuit 104.

In the present embodiment, for charging the secondary battery 105 in a normal state, it is enough that the value of the direct current $I_A$ supplied from the constant current circuit 104 is equal to or larger than a first current value (a first current reference value) $I_1$ that is smaller than the current value $I_C$. When the value of the direct current $I_A$ supplied from the constant current circuit 104 is smaller than a second current value (a second current reference value) $I_2$ that is smaller than the first current value $I_1$, the charging state of the secondary battery 105 is in an abnormal state, in which a charging operation of the secondary battery 105 cannot be completed. When the value of the direct current $I_A$ is between the first and second current values $I_1$, $I_2$, that is inadequate for the normal state of charging, the charging state of the secondary battery 105 is in an unusual state in which a required time for completion of charging is longer than that in the normal state.

According to the volt-ampere characteristic of the constant current circuit 104 shown in FIG. 5, when the value of the direct current $I_A$ supplied from the constant current circuit 104 is equal to the first current value $I_1$, the value of the direct voltage $V_{IN}$ inputted into the constant current circuit 104 is equal to a first voltage value (first voltage reference value) $V_1$.

Also, when the value of the direct current $I_A$ supplied from the constant current circuit 104 is equal to the second current value $I_2$, the value of the direct voltage $V_{IN}$ inputted into the constant current circuit 104 is equal to a second voltage value (second voltage reference value) $V_2$.

In other words, when the value of the direct voltage $V_{IN}$ inputted into the constant current circuit 104 is detected, the charging state of the secondary battery 105 can be determined in either one of the three different states of the normal state, the unusual state, and the abnormal state.

Thus, in the cordless handset 50, the charging state (either one of the normal, unusual and abnormal states) of the secondary battery 105 is determined based on the value of the direct voltage $V_{IN}$ inputted into the constant current circuit 104. Then the cordless handset 50 informs a user of the charging state of the secondary battery 105 as a result of determination, by displaying the result of determination on the display panel 53 of the cordless handset 50 and/or on the display panel 13 of the main phone 10.

Figure 6:
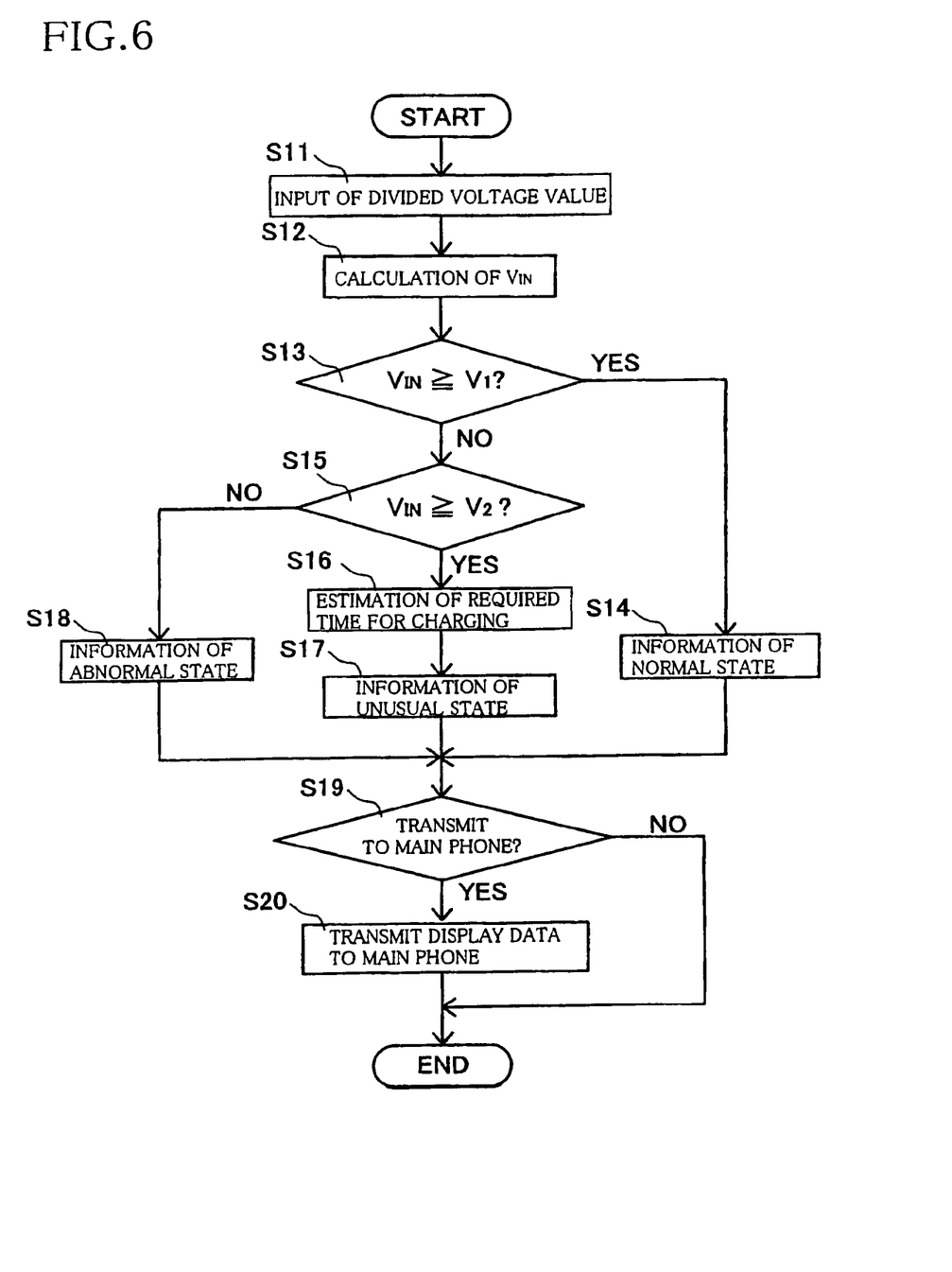
FIG. 6 is a flow chart illustrating a program in which the cordless handset informs a user of a charging state of a secondary battery.

FIG. 6 shows a flow chart illustrating a program for informing the user of the charging state of the secondary battery 105. The program shown in FIG. 6 is stored in the ROM of the controller 60 and is implemented by the CPU of the controller 60.

As shown in FIG. 6, first, in step S11, a divided voltage value is inputted into the controller 60. In the present embodiment, the divided voltage value constitutes the value of the direct voltage divided by the voltage-dividing resistor 106, which is inputted into the controller 60 after having been converted into the digital data by the A/D converter 107 as mentioned.

In step S12, the value of the direct voltage $V_{IN}$ inputted into the constant current circuit 104 is calculated. In the present embodiment, as the value of the direct voltage $V_{IN}$ inputted into the constant current circuit 104, the value of the direct voltage outputted from the rectification circuit 103 is calculated based on the divided voltage value calculated in step S11 and a resistance ratio of the voltage-dividing resistor 106.

In step S13, it is determined whether the value of the direct voltage $V_{IN}$ inputted into the constant current circuit 104 is not smaller than (equal to or larger than) the first voltage value $V_1$. The first voltage value $V_1$ is based on the volt-ampere characteristic of the constant current circuit 104 shown in FIG. 5. In a case where the value of the direct voltage $V_{IN}$ inputted into the constant current circuit 104 is not smaller than the first voltage value $V_1$, or an affirmative decision is obtained in step S13, step S14 is implemented to inform the user of the normal state of charging. For informing the normal state of charging, a message that the charging state of the secondary battery 105 is in the normal state is displayed on the display panel 53. Then step S19 is implemented.

On the other hand, in a case where the value of the direct voltage $V_{IN}$ inputted into the constant current circuit 104 is smaller than the first voltage value $V_1$, or a negative decision is obtained in step S13, step S15 is implemented to determine whether the value of the direct voltage $V_{IN}$ inputted into the constant current circuit 104 is not smaller than (equal to or larger than) the second voltage value $V_2$. The second voltage value $V_2$ is also based on the volt-ampere characteristic of the constant current circuit 104 shown in FIG. 5.

In a case where the value of the direct voltage $V_{IN}$ inputted into the constant current circuit 104 is not smaller than the second voltage value $V_2$, or an affirmative decision is obtained in step S15, step S16 is implemented to estimate a required time for charging of the secondary battery 105. The required time for charging is a time required until the charging of the secondary battery 105 is completed. For example, the required time for charging is calculated based on the following relational expression (1):

$$\text{charging capacity} = \text{coefficient} \times \text{charging current value} \times \text{required time for charging} \quad (1)$$

In the relational expression (1), the charging current value is the value of the direct current $I_A$ supplied from the constant current circuit 104 as mentioned above, and is calculated based on the value of the direct voltage $V_{IN}$ inputted into the constant current circuit 104 (i.e., the value calculated in step S12) according to the volt-ampere characteristic of the constant current circuit 104 shown in FIG. 5.

In step S17, the controller 60 informs the user of the unusual state of charging of the secondary battery 105. For informing the unusual state of charging, the display panel 53 displays, together with the required time for charging estimated in step S16, a message that the charging state of the secondary battery 105 is in the unusual state in which the required time for charging of the secondary battery 105 is longer than that in the normal state. The controller 60 may cause the receiver 62 to sound a first alarm that indicates the unusual state of charging. Then step S19 is implemented.

Estimating and informing of the required time for charging of the secondary battery 105 may be performed when the normal state of charging is informed in step S14. That is, in the state in which the value of the direct voltage $V_{IN}$ inputted into the constant current circuit 104 is not smaller than the first voltage value $V_1$ (S13: YES), the required time for charging of the secondary battery 105 is estimated, as in step S16, and subsequently in step S14, a message of the normal state of charging is displayed on the display panel 53, together with the required time for charging of the secondary battery 105.

In step S15, in a case where the value of the direct voltage $V_{IN}$ inputted into the constant current circuit 104 is smaller than the second voltage value $V_2$, or a negative decision is obtained in step S15, step S18 is implemented to inform the user of the abnormal state of charging of the secondary battery 105. In step S18, the controller 60 may cause the receiver 62 to sound a second alarm that indicates the abnormal state of charging. Then step S19 is implemented.

In step S19, it is determined whether data on the charging state (either one of the normal, unusual and abnormal states) of the secondary battery 105 are transmitted to the main phone 10. A determination in step S19 is based on environmental settings set by the user. In a case where it is determined that the data on the charging state of the secondary battery 105 are not transmitted to the main phone 10, or a negative decision is obtained in step S19, an implementation of the program is finished.

On the other hand, in a case where it is determined that the data on the charging state are transmitted to the main phone 10, or an affirmative decision is obtained in step S19, step S20 is implemented to transmit display data to the main phone The display data constitute a series of control data including the data indicating the charging state of the secondary battery 105, messages obtained in respective steps S14, S17 and S18, and the required time for charging of the battery 105 calculated in step S16, for example. Then an implementation of the program is finished.

The display data are transmitted to the main phone 10 by means of the wireless communication between the RF module 68 of the cordless handset 50 and the RF module 38 of the main phone 10. The main phone 10 which receives the display data, similarly in steps S14, S17 and S18, displays the messages and the required time for charging of the battery 105 on the display panel 13, and operates the handset 12 to sound an alarm. The display data may be transmitted to a different communication device such as a personal computer, different from the telephone apparatus 1 including the cordless handset 50 and the main phone 10.

According to the present embodiment, the first voltage value $V_1$ and the second voltage value $V_2$ constitute a first voltage reference value and a second voltage reference value, respectively. A portion of the controller 60 that implements step S12 of the flow chart illustrated in FIG. 6 constitutes a calculating portion, and a portion of the controller 60 that implements steps S11 and S12 constitutes an input-voltage acquiring portion.

Figure 7:
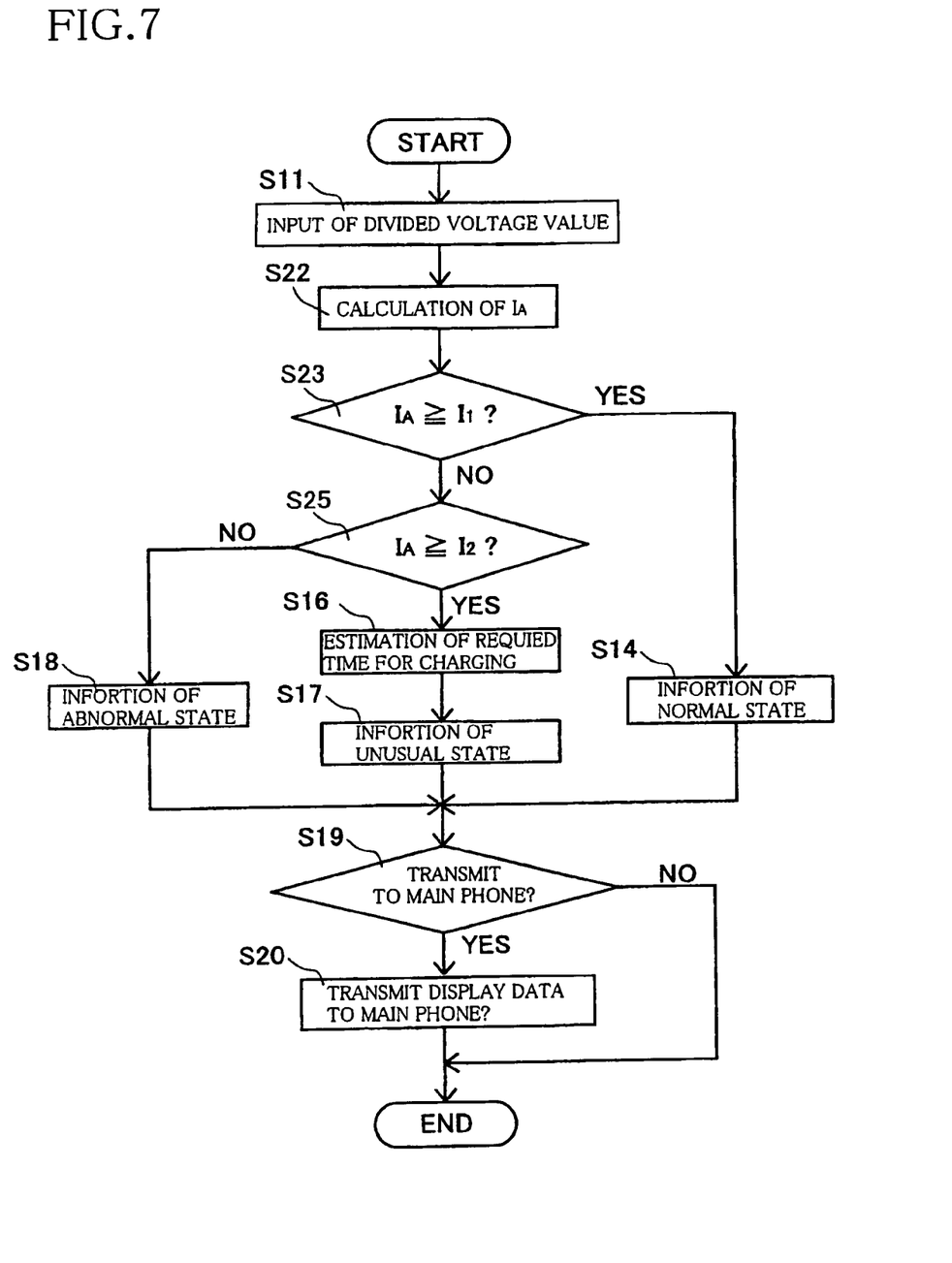
FIG. 7 is a flow chart illustrating a program for informing a user of a charging state of a secondary battery, the program being implemented in a cordless handset of a telephone apparatus as a second embodiment to which the present invention is applied.

Furthermore, as shown in a program illustrated in a flow chart of FIG. 7, the charging state of the secondary battery 105 (either one of the normal, unusual, and abnormal states) may be determined based on one comparison between the direct current $I_A$ supplied from the constant current circuit 104 (i.e., a charging current value of the secondary battery 105) and the first current value $I_1$, and the other comparison between the direct current $I_A$ and the second current value $I_2$. The first and second current values $I_1$, $I_2$ are current values based on the volt-ampere characteristic of the constant current circuit 104 shown in FIG. 5.

Steps of the program illustrated in the flow chart of FIG. 7 are the same as those in the flow chart of FIG. 6, except steps S12, S13 and S15 in the flow chart of FIG. 6, so that only different steps will be described below.

In the program illustrated in the flow chart of FIG. 7, instead of step S12 in the flow chart of FIG. 6, step S22 is implemented. In step S22, the value of the direct current $I_A$ supplied from the constant current circuit 104 is calculated. In the present embodiment, as the value of the direct voltage $V_{IN}$ inputted into the constant current circuit 104, the value of the direct voltage outputted from the rectification circuit 103 is calculated based on the divided voltage value calculated in step S11 and the resistance ratio of the voltage-dividing resistor 106. Then, the value of the direct current $I_A$ is calculated based on the value of the direct voltage $V_{IN}$ inputted into the constant current circuit 104 and the volt-ampere characteristic of the constant current circuit 104 shown in FIG. 5.

Further, in the program illustrated in the flow chart of FIG. 7, step S23 is implemented instead of step S13 in the flow chart of FIG. 6. In step S23, it is determined whether the value of the direct current $I_A$ supplied from the constant current circuit 104 is not smaller than (equal to or larger than) the first current value $I_1$. In a case where the value of the direct current $I_A$ supplied from the constant current circuit 104 is not smaller than the first current value $I_1$, or an affirmative decision is obtained in step S23, step S14 is implemented. On the other hand, in a case where the value of the direct current $I_A$ supplied from the constant current circuit 104 is smaller than the first current value $I_1$, or a negative decision is obtained in step S23, step S25 is implemented.

Furthermore, in the program illustrated in the flow chart of FIG. 7, step S25 is implemented instead of step S15 in the flow chart of FIG. 6. In step S25, it is determined whether the value of the direct current $I_A$ supplied from the constant current circuit 104 is not smaller than (equal to or larger than) the second current value $I_2$. In a case where the value of the direct current $I_A$ supplied from the constant current circuit 104 is not smaller than the second current value $I_2$, or an affirmative decision is obtained in step S25, step S16 is implemented. On the other hand, in a case where the value of the direct current $I_A$ supplied from the constant current circuit 104 is smaller than the second current value $I_2$, or a negative decision is obtained in step S25, step S18 is implemented. In the present embodiment, in step S16 in which the required time for charging of the secondary battery 105 is estimated, the value of the direct current $I_A$ calculated in step S22 is used.

As is apparent from the foregoing description of the present embodiment, the first and second current values $I_1$, $I_2$ constitute a first and second current reference values, respectively. A portion of the controller 60 that implements step S22 in the flow chart of FIG. 7 constitutes a calculating portion, and a portion of the controller 60 that implements steps S11 and S22 constitutes a charging-current acquiring portion.

As described in detail in the illustrated embodiments, in the cordless handset 50 as a cordless telephone apparatus shown in FIG. 1, the secondary coil 102 receives the alternating voltage via the magnetic flux energy generated by the primary coil 101 of the charging stand 80, and then the rectification circuit 103 converts the alternating voltage received by the secondary coil 102 into the direct voltage. The constant current circuit 104 limits the direct current outputted from the rectification circuit 103 to the constant current. The secondary battery 105 is charged with the direct current $I_A$ outputted from the constant current circuit 104.

In the cordless handset 50, the direct voltage outputted from the rectification circuit 103 is divided by the voltage-dividing resistor 106, and the divided direct voltage value is converted into the digital data by the A/D converter 107. Then the controller 60 calculates the value of the direct voltage $V_{IN}$ (i.e., the direct voltage outputted from the rectification circuit 103) inputted into the constant current circuit 104 or the value of the direct current $I_A$ outputted from the constant current circuit 104 as the charging voltage value or the charging current value of the secondary battery 105, based on the digital data from the A/D converter 107 and/or the volt-ampere characteristic of the constant current circuit 104 shown in FIG. 5 (steps S12, S22). Based on a calculation result obtained by the controller 60 (steps S13, S15, S23, S25), the charging state of the secondary battery 105 (either one of the normal, unusual and abnormal states) is indicated (shown) on the display panel 53 (steps S14, S17, S18).

Accordingly, the controller 60 calculates the value of the direct voltage $V_{IN}$ inputted into the constant current circuit 104 or the value of the direct current $I_A$ outputted from the constant current circuit 104, that is, the controller 60 calculates the direct voltage value or the direct current value during the actual charging of the secondary battery 105, so that the charging state of the battery 105 can be classified into at least three kinds of the charging state (in the illustrated embodiments, three kinds of the charging state consisting of the normal, unusual and abnormal states) and can be informed. Therefore, the charging state of the secondary battery 105 can be properly informed to the user.

More precisely, in the case where the value of the direct voltage $V_{IN}$ inputted into the constant current circuit 104 is not smaller than the first voltage value $V_1$ (S13: YES), or in the case where the value of the direct current $I_A$ outputted from the constant current circuit 104 is not smaller than the first current value $I_1$ (S23: YES), the message that the charging state of the secondary battery 105 is the normal state is displayed on the display panel 53 (step S14).

By using a comparison between the direct voltage $V_{IN}$ and the first voltage value $V_1$ or another comparison between the direct current $I_A$ and the first current value $I_1$, a state in which the charging of the secondary battery 105 is normally performed, i.e., the normal state of charging, can be determined as one of the at least three kinds of the charging state, and can be informed to the user, contributing to an action taken by the user after the normal state of charging was informed to the user.

Further, in the case where the value of the direct voltage $V_{IN}$ inputted into the constant current circuit 104 is smaller than the first voltage value $V_1$ (S13: NO), or in the case where the value of the direct current $I_A$ outputted from the constant current circuit 104 is smaller than the first current value $I_1$ (S23: NO), a predetermined condition is satisfied (S15: YES or S25: YES), and the message that the charging state of the battery 105 is the unusual state in which the required time for charging is longer than that in the normal state is displayed on the display panel 53 (step S17).

Therefore, by utilizing the comparison between the direct voltage $V_{IN}$ and the first voltage value $V_1$ or another comparison between the direct current $I_A$ and the first current value $I_1$, the unusual state of charging can be determined as another one of the at least three kinds of the charging state, and can be informed to the user, contributing to the action taken by the user after the unusual state of charging was informed to the user.

Further, in the case where the value of the direct voltage $V_{IN}$ inputted into the constant current circuit 104 is smaller than the second voltage value $V_2$, i.e., the negative decision is obtained in step S15, or in the case where the value of the direct current $I_A$ outputted from the constant current circuit 104 is smaller than the second current value $I_2$, i.e., the negative decision is obtained in step S25, the message that the charging state of the battery 105 is the abnormal state is displayed on the display panel 53 (step S18).

Therefore, by utilizing the comparison between the direct voltage $V_{IN}$ and the second voltage value $V_2$ or another comparison between the direct current $I_A$ and the second current value $I_2$, the abnormal state of charging, in which a normal charging operation cannot be performed, can be determined as another one of the at least three kinds of the charging state, and can be informed to the user, contributing to the action taken by the user after the abnormal state of charging was informed to the user.

The value of the direct voltage or the value of the direct current during the actual charging of the secondary battery 105 corresponds to the value of the direct voltage $V_{IN}$ inputted into the constant current circuit 104 or the value of the direct current $I_A$ outputted from the constant current circuit 104, based on the volt-ampere characteristic of the constant current circuit 104 shown in FIG. 5. A state where the direct current for charging the secondary battery 105 is inadequate corresponds to the linear (primarily proportional) portion of the volt-ampere characteristic of the constant current circuit 104, so that the state where the direct current for charging the secondary battery 105 is inadequate can be classified into a plurality of states (the unusual state and the abnormal state, in the illustrated embodiments) and be differentiated therebetween.

Furthermore, when the message of the unusual state of charging is displayed on the display panel 53 (step S17), the controller 60 estimates in step S16 the required time for charging the secondary battery 105 based on the above-mentioned relational expression (1). Thus, the required time for charging estimated by the controller 60 can be used for the control relating to the charging of the secondary battery 105. For example, in the illustrated embodiments, the display panel 53 displays the required time for charging the secondary battery 105 estimated by the controller 60, together with the message that the charging state is the unusual state in which the required time for charging is longer than that in the normal state (step S17), contributing to the action taken by the user after the unusual state of charging was displayed on the display panel 53.

Furthermore, the data including the charging state of the secondary battery 105 (in the illustrated embodiments, either one of the normal, unusual and abnormal states) are transmitted to the main phone 10 from the cordless handset 50 via the wireless communication (step S20). Then, in the main phone 10, the charging state of the secondary battery 105 is displayed on the display panel 13, and an alarm is produced in a case where the charging state is the unusual state or the abnormal state. Therefore, the user is able to know the charging state of the secondary battery 105 in the cordless handset 50, when the user is located near the main phone 10, even apart from the cordless handset 50. Especially, in the case where the charging state of the secondary battery 105 is the abnormal state, the cordless handset 50 becomes inoperable, so that it is useful for the user who is located apart from the cordless handset 50 to be informed of the abnormal state of charging.

As is apparent from the foregoing description of the illustrated embodiments, the first voltage reference value and the first current reference value correspond to a first reference value as one of two reference values, and the second voltage reference value and the second current reference value correspond to a second reference value as the other of two reference values. Further, a portion of the controller 60 that implements steps S11 through S13 and step S15 in the flow chart of FIG. 6, and a portion of the controller 60 that implements steps S11, S22, S23 and S25 in the flow chart of FIG. 7 correspond to a charging-state acquiring portion. A portion of the controller 60 that implements steps S14, S17 and S18 in FIG. 6, and a portion of the controller 60 that implements steps S14, S17 and S18 in FIG. 7 correspond to a charging-state informing portion, together with at least one of the display panel 13 of the main phone 10 and the display panel 53 of the cordless handset 50. Furthermore, respective portions of the controller 60 that implement respective steps S16 in FIG. 6 and FIG. 7 correspond to a required-time estimating portion, respective portions of the controller 60 that implement respective steps S20 in FIG. 6 and FIG. 7 correspond to a transmitting portion, and respective portions of the controller 60 that implement respective steps S17 in FIG. 6 and FIG. 7 correspond to a required-time informing portion, together with at least one of the display panel 13 of the main phone 10 and the display panel 53 of the cordless handset 50.

It is to be understood that the present invention may be embodied with various changes and modifications that may occur to a person skilled in the art, without departing from the spirit and scope of the invention defined in the appended claims. For example, in the program illustrated in the flow chart of FIG. 6, the volt-ampere characteristic of the constant current circuit 104 shown in FIG. 5 is used during implementing of respective steps S13, S15 and S16. The volt-ampere characteristic of the constant current circuit 104 may be stored in the form of an approximate expression and so on, or may be stored in the form of a table of data corresponding one-to-one, including a determination of the charging state of the secondary battery 105. The same may be applied to the program illustrated in the flow chart of FIG. 7 (steps S22, S23 and S25).

In the illustrated embodiments, the electric energy is contactlessly supplied from the primary coil 101 of the charging stand 80 to the secondary coil 102 of the cordless handset 50, so that a non-contact charging of the secondary battery 105 is performed. Therefore, in a case where the cordless handset 50 is improperly placed on the charging stand 80, the secondary coil 102 is misaligned with (or in a lifted position relative to) the primary coil 101, and the message that the charging state of the secondary battery 105 is the abnormal state or the unusual state is displayed. Further, in a case where the cordless handset 50 is placed in the charging stand 80 with a foreign matter existing therebetween, the message that the charging state of the secondary battery 105 is the abnormal state or the unusual state is displayed.

Figure 8A:
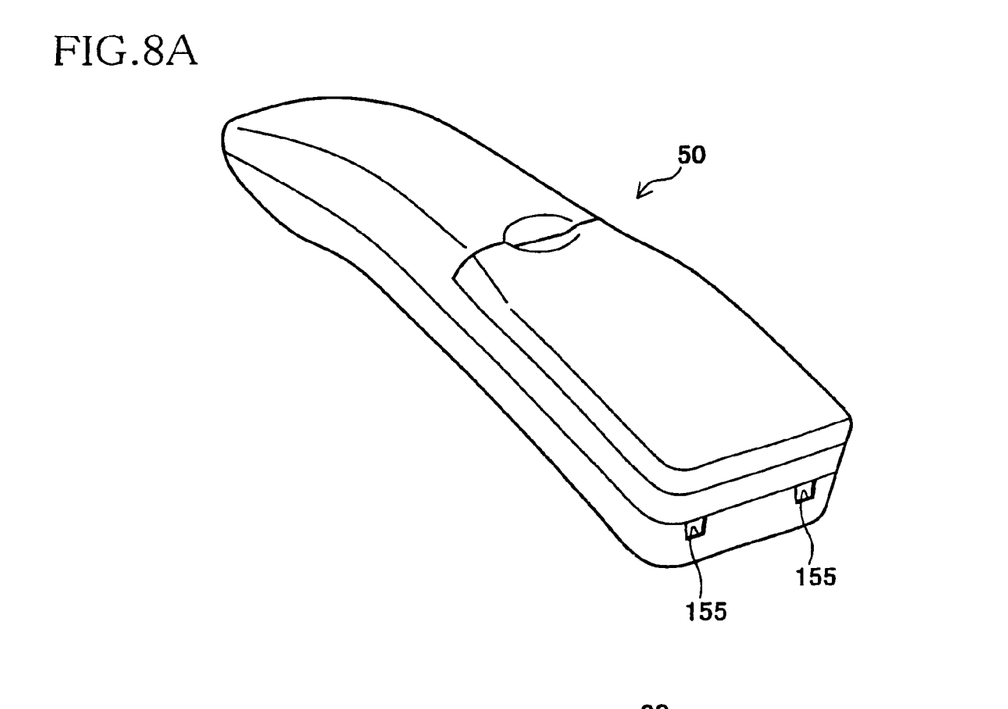
FIG. 8A is a perspective view of a rear surface of a cordless handset of the telephone apparatus as a third embodiment to which the present invention is applied.
Figure 8B:
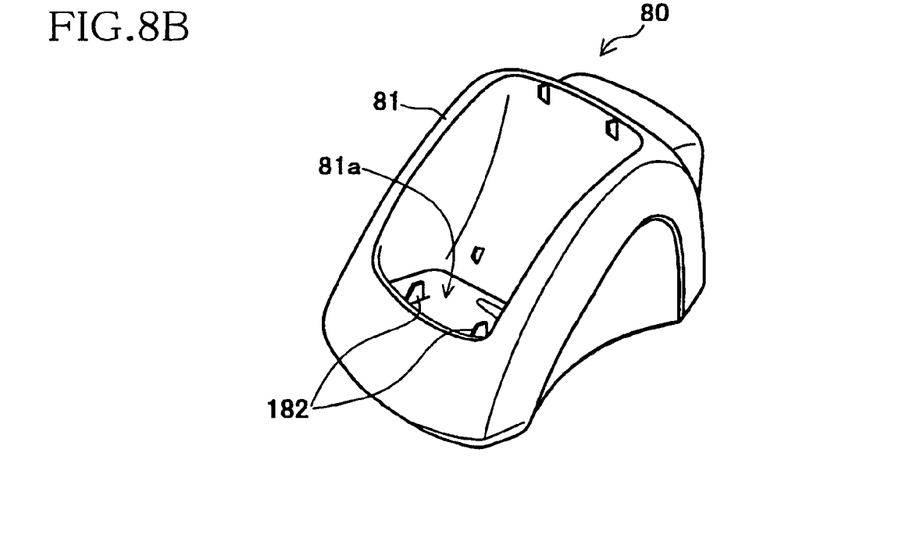
FIG. 8B is a perspective view of a charging stand of the telephone apparatus.

Instead of the primary coil 101 and the secondary coil 102, a charging terminal 182 may be provided in the recessed portion 81a of the charging stand 80 and a charging terminal 155 may be provided in the cordless handset 50, as shown in FIG. 8. When the cordless handset 50 is placed on the charging stand 80, the charging terminal 155 comes into contact with the charging terminal 182 so as to supply the electric energy in the form of direct current from the charging stand 80 to the cordless handset 50. In this embodiment, the rectification circuit 103 is omitted, and a contact-type charging is performed. Similarly to the non-contact charging, when the cordless handset 50 is improperly placed in the charging stand 80, the charging terminal 155 is misaligned with (or in a lifted position relative to) the charging terminal 182, and the message that the charging state of the secondary battery 105 is the abnormal state or the unusual state is displayed. Further, in a case where the cordless handset 50 is placed in the charging stand 80 with a foreign matter existing therebetween, the message that the charging state of the secondary battery 105 is the abnormal state or the unusual state is displayed. Furthermore, in a case where a coating is formed over at least one of the charging terminals 155, 182, the message that the charging state of the secondary battery 105 is the abnormal state or the unusual state is displayed. In the present embodiment, the charging terminal 155 constitutes a current-receiving portion which receives the direct current.

The present invention is applicable to a technology for detecting and informing a charging state of a battery of a cordless telephone apparatus.

What is claimed is:

1. A cordless telephone apparatus comprising:
    a battery which is rechargeable with a direct current based on an electric energy supplied from an outside of the cordless telephone apparatus;
    a constant current circuit which limits the direct current charged into the battery to a constant current;
    a voltage-dividing resistor which divides a direct voltage inputted into the constant current circuit;
    an A/D converter which converts a value of the direct voltage divided by the voltage-dividing resistor into digital data;
    a charging-state acquiring portion which acquires a charging state of the battery based on the digital data from the A/D converter; and
    a charging-state informing portion which informs the charging state of the battery acquired by the charging-state acquiring portion.

2. The cordless telephone apparatus according to claim 1, wherein the charging-state acquiring portion acquires the charging state of the battery based on the digital data from the A/D converter and a volt-ampere characteristic of the constant current circuit.

3. The cordless telephone apparatus according to claim 1, wherein the charging-state acquiring portion includes a calculating portion which calculates a charging-state value representing a value of the charging state of the battery based on the digital data and a volt-ampere characteristic of the constant current circuit, and
    wherein the charging-state acquiring portion acquires the charging state of the battery based on the charging-state value calculated by the calculating portion.

4. The cordless telephone apparatus according to claim 3, wherein the charging-state informing portion informs that the charging state of the battery is a normal state in a case where the charging-state value calculated by the calculating portion is not smaller than a reference value.

5. The cordless telephone apparatus according to claim 4, wherein the charging-state informing portion informs that the charging state of the battery is an unusual state, in which a required time for charging the battery is longer than that in the normal state, in a case where the charging-state value calculated by the calculating portion is smaller than the reference value.

6. The cordless telephone apparatus according to claim 4, wherein the charging-state informing portion informs that the charging state of the battery is an abnormal state in a case where the charging-state value calculated by the calculating portion is smaller than a second reference value that is smaller than a first reference value as the reference value.

7. The cordless telephone apparatus according to claim 3, further comprising a transmitting portion which transmits, to an external equipment connected to the cordless telephone apparatus, data that the charging state of the battery is an abnormal state in a case where the charging-state value calculated by the calculating portion is smaller than a reference value.

8. The cordless telephone apparatus according to claim 3, further comprising a required-time estimating portion which estimates a required time for charging the battery based on the charging-state value calculated by the calculating portion.

9. The cordless telephone apparatus according to claim 8, further comprising a required-time informing portion which informs an estimation result obtained by the required-time estimating portion.

10. The cordless telephone apparatus according to claim 1, wherein the charging-state acquiring portion determines that the charging state of the battery is either one of at least three kinds of charging states, based on respective comparisons between the digital data from the A/D converter and at least two reference values different from each other.

11. The cordless telephone apparatus according to claim 10, wherein the at least two reference values consist of voltage reference values.

12. The cordless telephone apparatus according to claim 11, wherein the charging-state acquiring portion includes an input-voltage acquiring portion which acquires an input voltage inputted into the constant current circuit, based on the digital data from the A/D converter, and
wherein the input voltage acquired by the input-voltage acquiring portion is compared with the voltage reference values.

13. The cordless telephone apparatus according to claim 10, wherein the charging-state acquiring portion includes a charging-current acquiring portion which acquires a charging current supplied to the battery based on the digital data from the A/D converter, and
wherein the at least two reference values consist of current reference values which should be compared with the charging current.

14. The cordless telephone apparatus according to claim 1, further comprising:
a current-receiving portion which receives an alternating current; and
a rectification circuit which converts the alternating current received by the current-receiving portion into a direct current,
wherein the constant current circuit limits the direct current outputted from the rectification circuit to the constant current.

15. The cordless telephone apparatus according to claim 14, wherein the current-receiving portion includes a secondary coil which receives the alternating current via a magnetic flux energy generated by a primary coil.

16. The cordless telephone apparatus according to claim 1, further comprising a current-receiving portion which receives a direct current,
wherein the constant current circuit limits the direct current received by the current-receiving portion to the constant current.

* * * * *